Sept. 19, 1939. F. O. HORSTMANN ET AL 2,173,416
GAS PRESSURE GOVERNOR
Filed Nov. 23, 1937
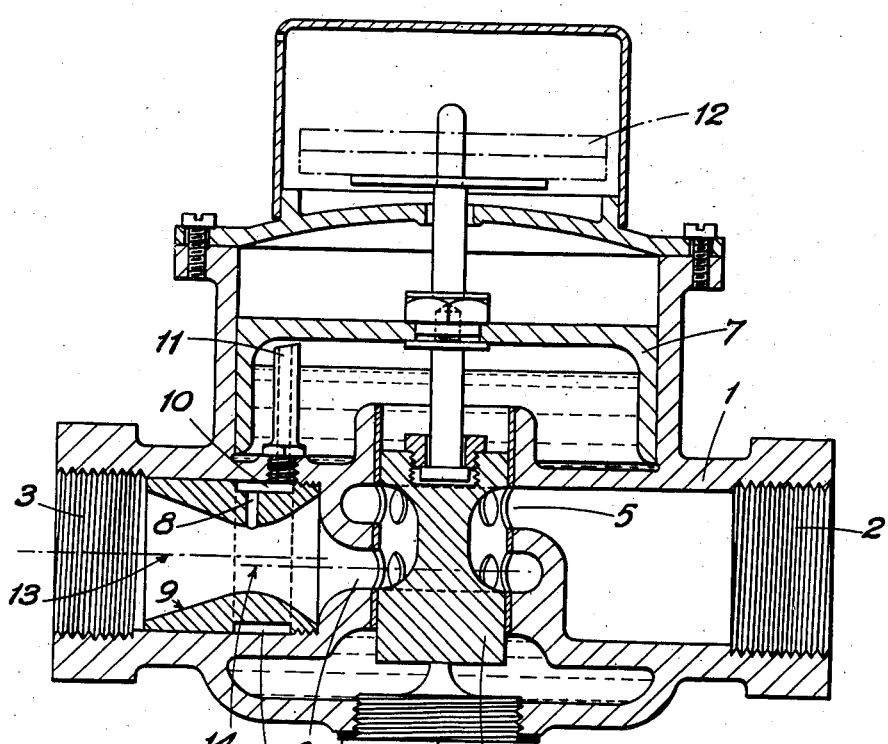
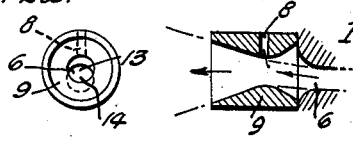
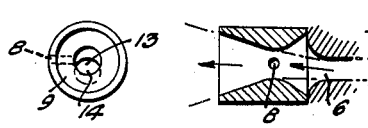
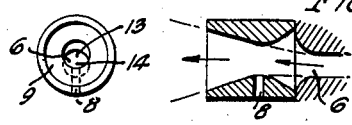
INVENTORS
FREDERICK O. HORSTMANN
PERCIVAL F. HORSTMANN
By
Atty.

Patented Sept. 19, 1939

2,173,416

UNITED STATES PATENT OFFICE 2,173,416

GAS PRESSURE GOVERNOR

Frederick Otto Horstmann and Percival Francis Horstmann, Bath, England

Application November 23, 1937, Serial No. 176,095
In Great Britain May 21, 1937

1 Claim. (Cl. 50—36)

This invention relates to pressure governors for fluids, principally gas, of the kind comprising a body formed with an inlet and an outlet for the fluid and ports co-operating with a valve for controlling the passage of fluid from the inlet to the outlet, means subject to the pressure on the outlet side for controlling said valve and means for producing compensation, whereby the set pressure on the controlled side is automatically increased in proportion to the volume of fluid passing through the governor, utilising an ejector principle set up by the passing fluid.

According to the invention, the compensating means comprises a Venturi tube which is mounted for adjustment in the governor outlet to vary the compensating effect as may be desired or necessary.

The invention will now be more particularly described by way of example with reference to the accompanying drawing, in which Fig. 1 shows a pressure governor constructed according to the invention in longitudinal sectional view.

Figures 2, 2ª; 3, 3ª; and 4, 4ª are diagrammatic views respectively illustrating the different positions of the adjustable venturi and graphically illustrating the gas flow.

Referring to the drawing, the governor body 1 has an inlet 2 and an outlet 3, the piston valve 4 controlling inlet and outlet ports 5 and 6. The valve 4 is controlled by a piston 7, which communicates with the outlet side through the radial passage 8 of the throat of the Venturi tube 9 (which forms the compensating means), the annuler groove 10 of the venturi and the tube 11, the piston 7 being thus subject to the action of the pressure on the outlet side, which acts against a resisting force constituted by the weight of the piston and, if required, by the weight of the adjusting discs 12. As is well known, the valve lifts towards the closing position when a predetermined or set pressure on the controlled side 3 is exceeded.

The Venturi tube 9 forming the compensating means produces an ejector action whereby this set pressure is automatically increased in proportion to the volume of fluid passing through the governor.

It is desirable that the compensating effect produced shall be capable of setting or adjustment and it has been found that in the embodiment shown this can be done by varying the distance apart of the inner end of the communication passage 8 of the venturi 9 from the axis of the outlet port 6, indicated in the drawing at 14.

In order that this may be accomplished in an easy and practical manner, the venturi 9 is rotatably mounted with its axis 13 spaced from the axis 14 of the outlet port 6 so that by rotation of the venturi 9 the compensating effect may be set or adjusted. When the distance apart of the inner end of passage 8 and the axis 14 is smallest the compensating effect (the suction at said passage end) is largest and when said distance is largest the compensating effect (the suction at said passage end) is smallest.

Any suitable means, such as a threaded ring to be screwed into the tapped outlet 3, may be provided for locking the venturi 9 in adjusted position.

When the venturi is set as shown in Figures 1 and 2, the gas stream $x$ issuing from the port 6 strikes the curved tapering mouth of the Venturi passage on one side and the gas stream is consequently deflected upwardly as shown by the diagram, Figure 2. With the Venturi sleeve in this position the gas tends to crowd into the corner of the side passage and cancels to a certain extent, the slight reduction in pressure which normally occurs in the side passage due to the well known Venturi phenomenon.

According to Figure 3, that is, when the venturi is rotated 90° from the position shown in Fig. 1, the gas stream $x$ has only a normal effect on the hole. That is, when the venturi is in this position, it is found that the Venturi action is practically normal. In other words, the same result is obtained as if the axis 14 of the port 6 was in line with the axis 13 of the Venturi sleeve.

When, however, the Venturi sleeve is rotated through 180°, to the position shown in Fig. 4, the effect is opposite to that shown in Fig. 1, that is, the natural reduction in pressure at the opening 8 is slightly increased or added to. Thus, when the gas avoids the opening 8 in the venturi, increase in compensation is effected.

If the Venturi sleeve were omitted altogether, the governor would maintain the outlet gas pressure at practically the same level through the whole range of gas rate capacity, because the pressure supporting the piston 7 will be the same as the pressure in the passage 3. It is, however, desirable to slightly increase the outlet pressure at large rates of gas flow where governors are used for certain purposes especially when controlling the gas pressure in dwelling houses. In order to provide the desired control of the pressure in the pressure chamber, beneath the piston 7, it is, therefore, desirable to use a venturi having the characteristics shown and described herein.

In a modification axial sliding movement of the Venturi tube is employed to vary the degree of compensation.

We claim:

1. A fluid pressure governor comprising a casing having a fluid inlet chamber and port and a fluid outlet chamber and port, a valve controlling flow of fluid through said ports, means tending constantly to open said valve, pressure operable means for closing said valve, a venturi in the outlet chamber having only a single opening extending transversely through the side wall thereof and in constant communication with said pressure operable means, whereby the latter means is subjected to the pressure of the fluid in the venturi, the outlet end of said outlet port being disposed adjacent to and opening into said venturi, said venturi being rotatably adjustable within said outlet chamber and being eccentrically mounted with respect to the axis of said outlet port, whereby rotatable adjustment thereof varies the spacing of the inner end of said opening from the axis of said outlet port, to regulate the pressure in said pressure chamber.

FREDERICK OTTO HORSTMANN.
PERCIVAL FRANCIS HORSTMANN.